FULL LOGIC DIAGRAM FOR m-OUT-OF-n MAJORITY VOTING WITH PULSE CODING

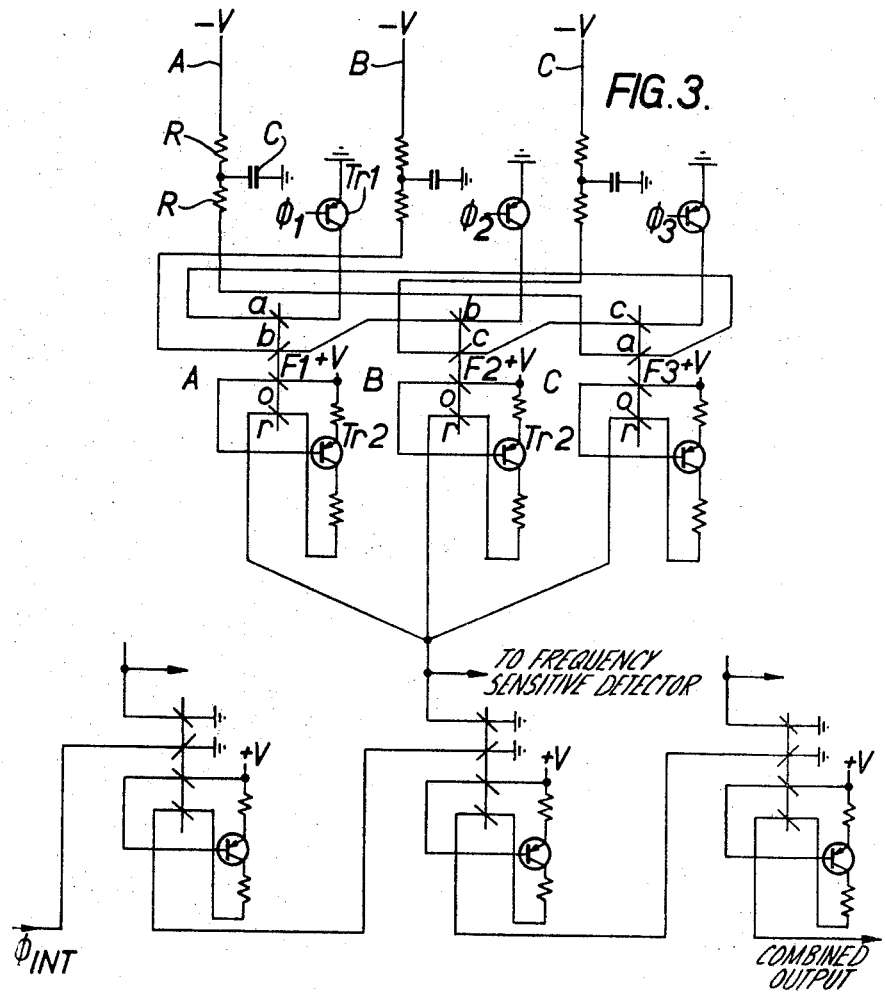
FIG. 3.
FIG. 3A.
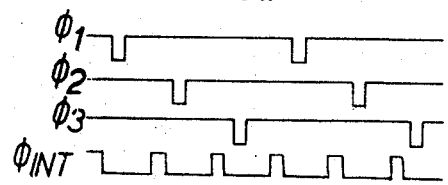

WHERE m=4 AND n=6.

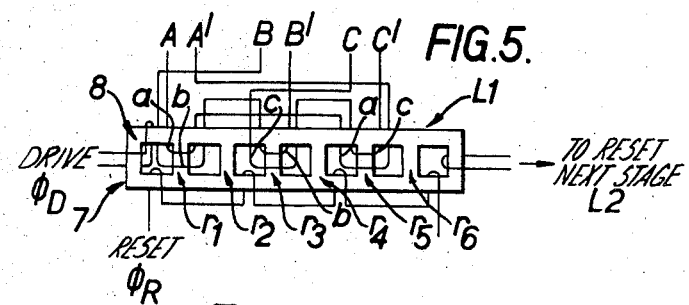
FIG. 5.
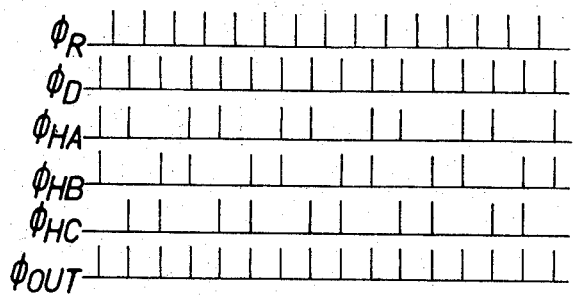
FIG. 5A.
FIG. 5B.
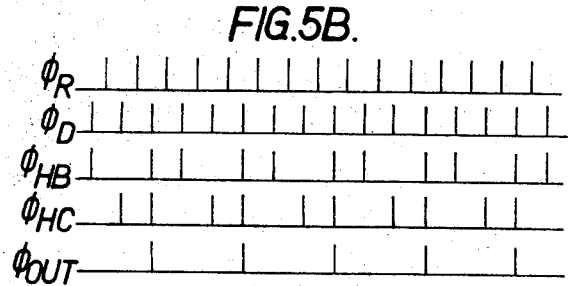
FIG. 5C.

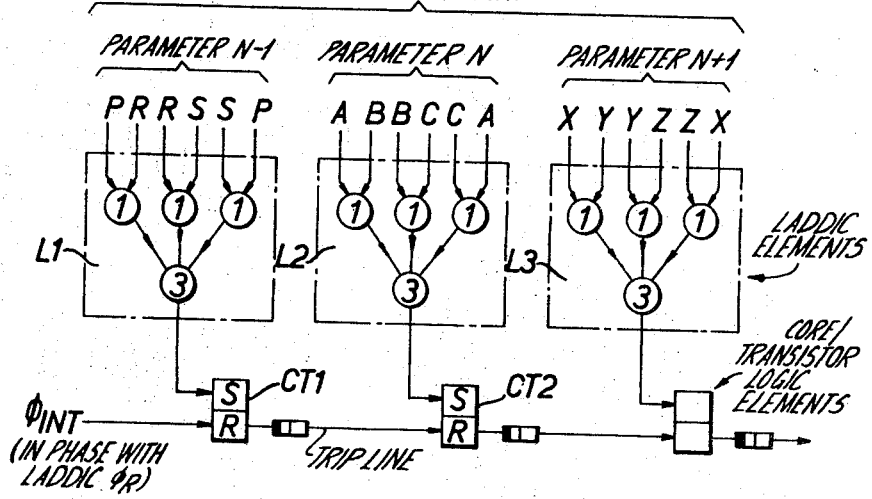
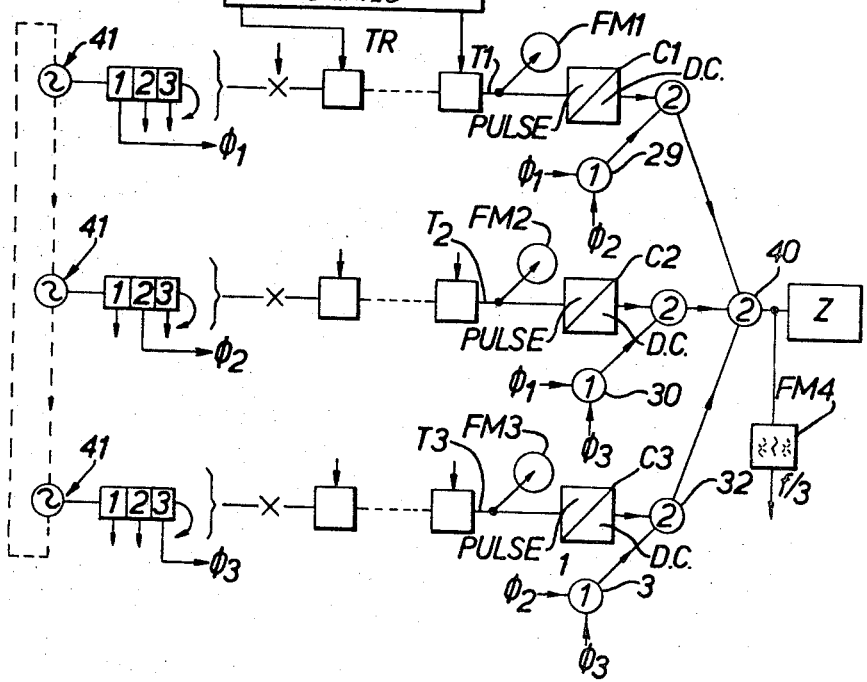

3,548,379
ELECTRICAL CONTROL SYSTEM ARRAY RESPONSIVE TO PLURAL PULSE TRAINS
Albert Brian Keats, Dorchester, England, assignor to United Kingdom Atomic Energy Authority, London, England
Filed Jan. 19, 1966, Ser. No. 521,655
Claims priority, application Great Britain, Jan. 26, 1965, 3,411/65
Int. Cl. H04q 9/14
U.S. Cl. 340—166                                    4 Claims

ABSTRACT OF THE DISCLOSURE

A supervisory circuit for supervising the presence of input signals on a group of $n$ input conductors wherein $n$ pulse trains each having a characteristic unique to a corresponding input are applied to a majority logic system which provides an output in response to the presence of a majority $m$ of said $n$ inputs. The system includes a network of $n$ gates connected in parallel to which are applied a different combination of $m$ pulse trains, the characteristic of each pulse train being such that the system output is of a form which is indicative of those inputs present.

---

Figure 1A:
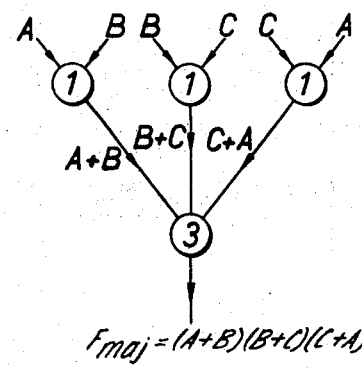

This invention relates to digital logic circuits and electrical control systems for plant or process control purposes using logic circuits. Such control systems usually employ a measuring instrument arranged in response to a value of a parameter to initiate a signal which is applied to a transducer for influencing the plant or process in a predetermined manner or perhaps to give a warning that a limiting value has been attained. The operation of the transducer may therefore have significant effect on the plant and it is important that not only must the conrol system be reliable, but the risk that the transducer be operated in response to a spurious signal must be minimised. It is the practice to construct the measuring instruments in a fail safe manner, that is so that if they yield a false signal, their output signal is identical with the signal that would be produced in abnormal conditions, for this reason the instruments usually deliver an output in normal conditions and abnormal conditions are signified by an absence of an output. In addition, the reliability is improved by adopting the principle of redundancy in so far that the instruments themselves and the transmission lines for relaying the warning signal to the transducer are replicated. In this manner, information on the limiting parameter or parameters is conveyed by a number of channels to the transducer. To minimise spurious operation of the latter, transducers are made to operate only in response to the majority of the replicated lines. For the latter purpose, logic elements have been inroduced into the system between the measuring instrument and the transducer, and such logic elements as have been proposed hitherto and which exhibit considerable advantage, embody a so-called dynamic logic condition in which the element is continuously exercised in both its states by the presence of an alternating electrical signal, the element being incorporated in a logic system responsive to the presence or absence of the alternating signal. For example in a majority decision network of logical gates (herein referred to as a majority logic system) the output takes up one of two states determined by the states exhibited by the majority of the replicated lines. In a safety circuit embodying majority logic the presence of an output may be employed to hold off the operation of a plant or process transducer only so long as inputs from a majority of instruments are present, the transducer being operated to give a warning or to exercise a control only when a majority, at least of the inputs are absent.

A majority logic system is a special case of a circuit for sensing the presence of $m$ or mark inputs out of a possible total of $n$ inputs hereinafter referred to as an "$m$ out of $n$ logic circuit." Another special case of an $m$ out of $n$ logic circuit is called an OR circuit in which $m=1$. Another special case is when not all inputs have equal value, for example a logic circuit for the Boolean expression $A+BC$.

Thus according to one aspect of the invention, a logic $m$ out of $n$ circuit is arranged so that an output signal is coded to give information on the state of a number of input channels by patterns of clock pulses, which have a pulse repetition frequency such that a number of clock pulses can be present in each output and which are fed into the logic circuit in the form of modulations of the input signals on those channels.

According to another aspect of the present invention an $m$ out of $n$ logic circuit is provided which produces characteristic pulse patterns at its output only in response to the presence of $m$ or more out of $n$ inputs, the characteristic of the pulse patterns being such that the output from the logic element allows absence of an input to be recognised. A transducer may be provided to exercise a control on the plant or process in response to the presence or absence of output from the logic element.

To allow information to be communicated when the number of inputs present lies between $m$ and $n$ some characteristic of the input present signal must be variable and this characteristic must be one which is not only readily detectable but it must not impair the logical operation on the signal. Typically the input is in the form of a pulse and the characteristic which is made variable is the pulse repetition frequency so that the input becomes a train of pulses, a change in the number of pulses in the output being used to indicate a change in the number which makes up the minority of the inputs. The distribution of pulses in the output pattern may signify which input (or inputs) is absent. The absence of more than $n-m$ inputs may be represented by a complete absence of pulses (p.r.f.$=0$).

According to a further aspect an $m$ out of $n$ logic circuit has means for coding input signals on input channels into a combination of pulses from a train of pulses which combination is characteristic of the respective channel and is arranged to perform the logical operation on those pulses which are synchronous with one of the train of pulses repeatedly to perform the logical operation for each of the train of pulses so that the output contains information on various combinations of input channels in addition to the desired logical output information.

Logic circuits in general are very complicated if they have to provide information on the states of inputs because further logical circuits have to be provided in order to supply such information. The present invention however allows the logic circuit within the period of one logical decision to work out several logical decisions in parallel and whilst the circuits have to operate at higher speeds most logic circuits used for process control have a good margin in hand.

Figure 1B:
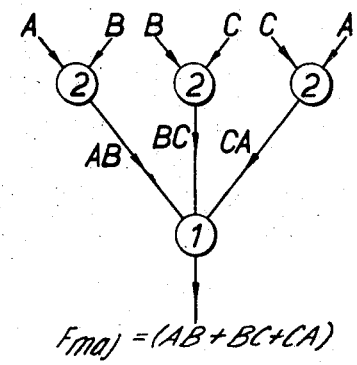
Figure 2A:
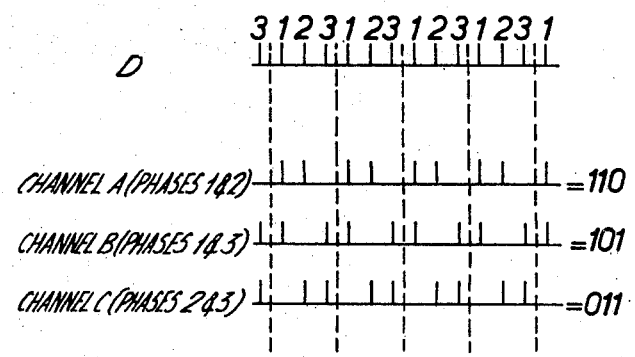
Figure 2B:
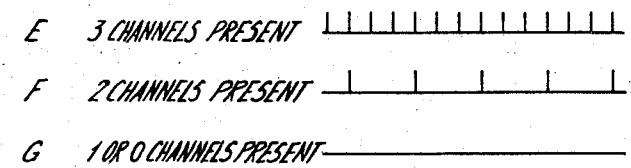
Figure 4:
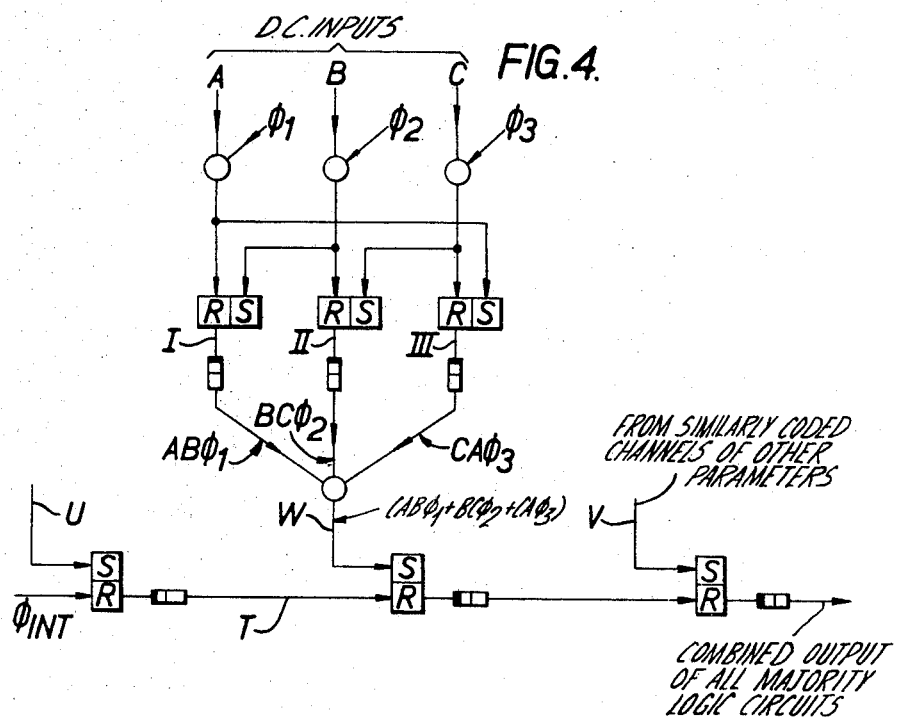
Figure 4A:
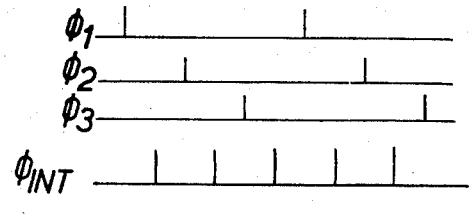
Figure 4B:
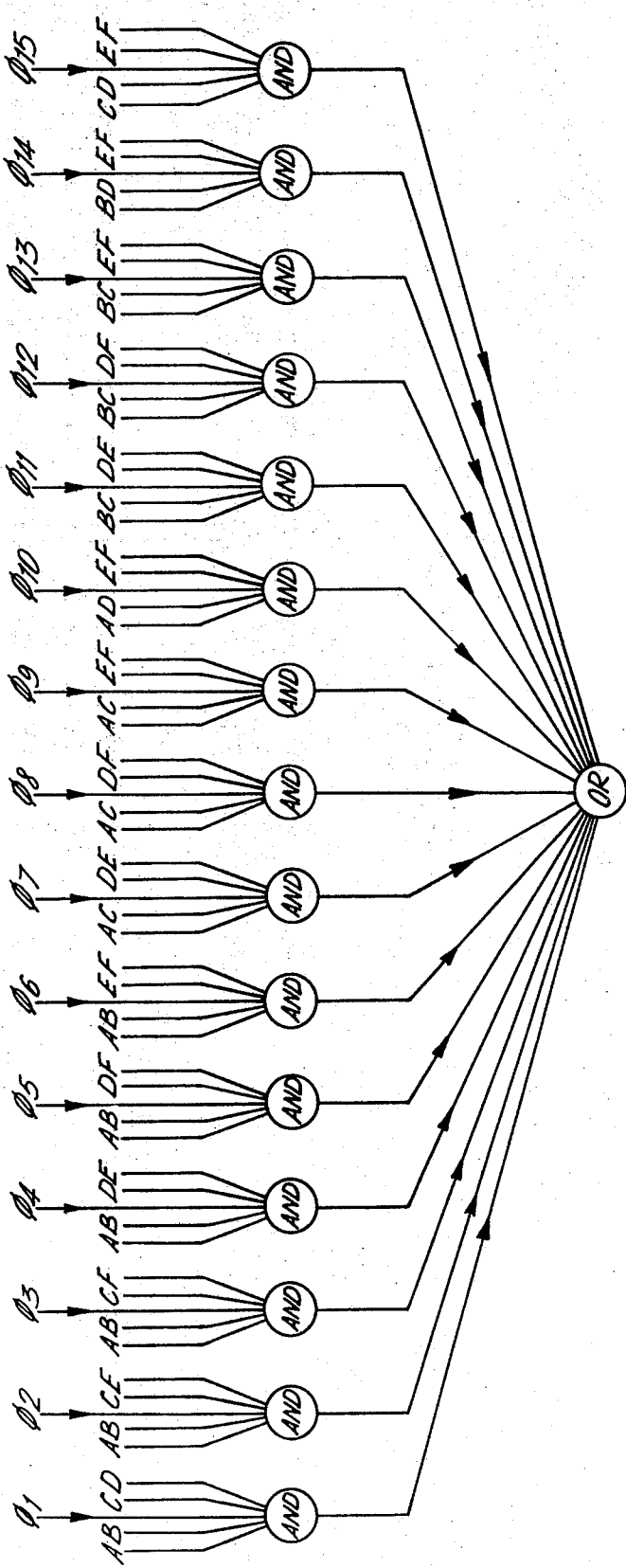
Figure 4C:
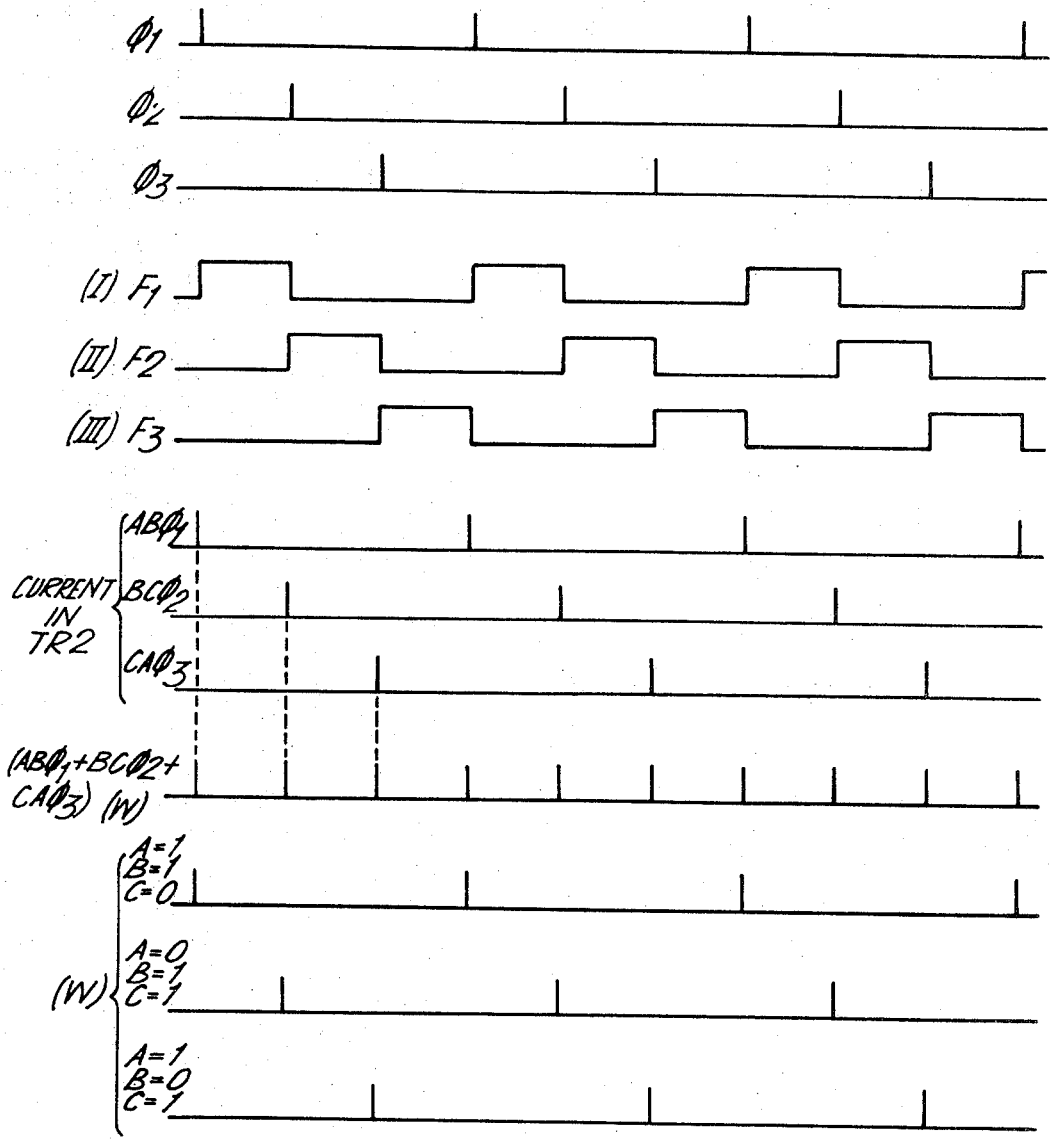

The invention will be more fully understood from the following description, which describes the invention as applied to a two out of three redundancy system, reference being made to the accompanying drawings in which:

FIGS. 1A and 1B are diagrams which show two forms of majority logic to which the present invention is applicable, FIGS. 2A and 2B are pulse patterns exemplary of pulse coding applied to the logic sytem of FIG. 1A, FIG. 3 is a circuit diagram which employs circuit logic of FIG. 1B using, typically, ferrite cores as logic elements, FIG. 3A shows pulse patterns involved in the coding in FIG. 3, FIG. 4 is a logic diagram pertaining to FIG. 3, FIG. 4A shows pulse patterns pertaining to FIG. 4, FIG. 4B is a fully logic diagram for $m$-out-of-$n$ majority voting with pulse coding where $m=4$ and $n=6$, FIG. 4C is a timing diagram pertinent to the embodiof FIG. 3, FIG. 5 shows an arrangement employing a multi apertured magnetic core as a majority logic element generally according to the arrangement of FIG. 1A, FIGS. 5A, B and C show pulse patterns pertaining to FIG. 5, FIG. 6 is a logic diagram pertaining to FIG. 5 showing a logic system in which a number of multi-apertured cores are combined into a single trip line feeding a transducer and FIG. 7 is a diagram showing a perferred method of proof testing systems which incorporate the pulse coded method described.

Referring firstly to FIGS. 1A and 1B, there is shown the two forms of logic, the conjunctive form and the disjunctive form to which the present invention is applicable, employing as inputs three variables A, B and C in a majority logic system and passing an output in response to the presence of at least two out of three of the inputs. In FIG. 1A, a different pair of the three inputs is applied to each of three OR gates and the outputs from these are fed to an AND gate which produces an output, in response to the presence of at least two inputs, which output is characteristic of the number of inputs present. In FIG. 1B, the different pairs of the three inputs are applied to AND gates, the output from each of which is a function of both inputs. The outputs from the AND gates are applied to a OR gate, as in FIG. 1B.

It is considered possible to operate any logic element, e.g. relays or magnetic cores, to perform the majority logic functions in accordance with the manner shown either in FIG. 1A or FIG. 1B but the physical properties of the elements chosen and the method employed to code the signals may favour one particular logic form.

Pulse coding methods suitable for each form of majority logic are now considered. In FIG. 2A, there is shown a code suitable for the conjunctive logic form of FIG. 1A. A clock pulse train D is divided into three phases 1, 2 and 3 which are arranged in three pairs to identify three channels A, B and C. As each of the OR gates in FIG. 1A has a different pair of inputs, the outputs of the OR gates will contain all three clock pulse phases when all inputs are present. The output of the combining AND gate will therefore contain all 3 clock pulses, i.e. the p.r.f. will be that of the basic clock pulse pattern and identifiable as such at E in FIG. 2B. If one input disappears, or is removed, 2 of the OR gates of FIG. 1A will have only one input remaining. These remaining inputs will contain two different pairs of clock pulses and therefore the inputs to the AND gates will coincide only on one phase. Consequently, the output of the AND gate will have a pulse repetition frequency (p.r.f.) of only ⅓ of the basic clock pulse repetition frequency (FIG. 2B) at F. If more than one input is removed, both inputs to at least one of the OR gates will be missing and no pulses will be applied to the corresponding input to the AND gate as at G. The output condition of the AND gate representing a majority of inputs missing, is therefore a complete absence of pulses, i.e. zero p.r.f.

The technique described may be extended to any number of channels and may be summarised as follows: If $n=$total number of inputs and $m=$the number of inputs required to be in an ON condition to cause an output to be in an ON condition, then the number of clock pulse phases required at the most equals $^nC_m$. The notation $$^nC_m = \frac{n(n-1)(n-2)\ldots(n-m+1)}{1, 2, 3 \ldots m}$$

Each input must be allocated a unique pulse pattern shown so that any particular clock phase is allocated to $m$ out of the $n$ inputs.

Pulse patterns can be derived for any values of $m$ and $n$ and the following results generally apply.

(a) If one input fails, the output pulse pattern will be the inverse (or complement) of the identification pattern of the failed input and the mean p.r.f. will be F clock $(1-m/n)$ where F clock=clock pulse frequency.

(b) If $(n-m)$ inputs fail, only one of the clock phases will remain and the p.r.f. will therefore be reduced to F clock/$n_{Cm}$.

(c) If the number of failed inputs ($r$) is between 1 and $n-m$, then the output pattern will be the inverse of the sum of the corresponding identification patterns and the reduction factor in mean p.r.f. will be $^{n-r}C_m./^nC_m.$, which lies between $(1-m/n)$ and $1/n_{Cm}$. For example, as explained more fully below if $n=6$ and $m=4$ the required number of clock pulse phases=$6_{C_4}=15$. Change in mean p.r.f. due to removal of one input $$=(1-m/n)=⅓$$

Change in mean p.r.f. due to removal of $n-m$ inputs $$⅙_{C_4}=1/15$$

If the pulse coding patterns described above are applied to the form of majority logic gate network given in FIG. 1B, it will be found that each combination of 2 (or $m$) inputs will coincide on only one clock phase. The phase of the coincidence will be different for each combination and as the number of clock pulses is the same as the number of possible combinations of inputs ($^nC_m.$), all clock phases will be presented to the OR gate when all inputs are present. This application is described in more detail below with reference to FIGS. 3 and 4.

FIG. 4B shows the full logic diagram of the case referred to under paragraph (c), line 25 of Col. 4 where $n=6$ and $m=4$. It will be seen by inspection of FIG. 4B that if any one of the input terms A to F is absent (corresponding to the logic "0" condition) then 10 of the 15 terms of the output expression become zero. That is, the mean repetition rate drops to 1/15 of the original rate. If more than 2 input terms are zero, then all the output terms are zero, i.e. there is no output. It can now be seen that by strobing the input combinations it is possible to discriminate, at the output of an $m$ out of $n$ decision network, between the presence of all the inputs and loss of a minority of inputs.

An alternative way of applying pulse coding to this arrangement of FIG. 1B is to allocate a single clock phase to each combination of inputs rather than each individual input. The number of clock phases is the same as in the system above and the results of removing a minority of inputs is also the same in terms of change in p.r.f.

The above technique, or testing method, finds application for control by a number of parameters of a nuclear reactor plant where reactor safety rods or reactor shutdown devices are operated by a transducer to which the response of measuring instruments located to sense several critical reactor parameters is applied. For safety reasons the lines (or so called trip lines) carrying signals determined by several separately measured different parameters, any one of which may initiate a trip of the reactor. Each parameter is itself measured by a group of several instruments, conveniently three, and the signal applied to the transducer via a majority logic element which causes or allows the transducer to operate to trip the reactor (usually) as a result of the no signal response of two out of three instruments or else by signals from the instruments indicative of an unsafe condition.

FIG. 3 shows the circuit diagram in which the logic functions shown in FIG. 4 are applied to a majority logic system using a combination of a ferrite core and a transistor as the logic element. FIG. 3 is substantially self explanatory but to assist the reader a detailed timing diagram FIG. 4C may prove useful. The three measuring instrument channels A, B and C receive small voltage signals from their respective instruments when these are working correctly and measuring a parameter within a predetermined limit, otherwise there is no signal. The voltage is in each case converted to a unique pulse pattern $\phi_1$, $\phi_2$, $\phi_3$ respectively (FIG. 3A) by a switching circuit including a transistor $Tr1$, capacitor C and resistance R. From a clock pulse generator (not shown), characteristic pulse patterns are applied to the transistor base, and during the pulse intervals the capacitor C is allowed to accumulate charge due to the signal current. The arrival of a negative going pulse discharges the capacitor through a collector circuit. In each channel, the latter includes a pair of windings wound on a different pair of three ferrite cores F1, F2, F3, the windings being designated by a small case reference $a$, $b$, $c$ according to the channel to which they belong. The cores carry also an output winding $o$ and a resetting winding $r$ which form part of a circuit for regeneratively resetting the core, so that when the core is switched between two magnetic states, by two pulses say $\phi_1$ and $\phi_2$, the pulse which appears in the output winding $o$ is applied to the base of a transistor $Tr2$ causing current to flow from a local source through resetting winding $r$ which resets the flux in the core in the same sense as the $\phi_1$ pulse in winding $a$.

Pulse patterns $\phi_1$, $\phi_2$, $\phi_3$ are thus applied during proper working to two of the three cores F1–F3, and a properly shaped output pulse is taken from each resetting winding. The output pulse patterns are combined ($\equiv$ logical OR of FIG. 1B) into a trip line in a manner which completes the two out of three majority logic, and provides the SET inputs to the core/transistor logic elements which form the trip line. The RESET being effected by an independently generated pulse pattern $\phi_{INT}$ (FIG. 3).

The combined output current of the transistors $Tr2$ forms the output of the majority-decision logic circuit. The logical OR gate (FIG. 4) is realized in practice (FIG. 3) by a mode or connection of the three $Tr2$ transistor collector circuits.

In the logic diagram (FIG. 4) each of the cores is considered to be, and indeed shown as a bistable element having two inputs which are capable of switching the core from "set" S to "reset" R conditions, and which must be applied alternately for an output to be provided. Each of the three ferrite core/transistor stages I, II and III, shown in majority logic configuration is connected to receive a SET and RESET from two different channels of the three channels A, B and C. The signals from the channels B and C are gated into the core/transistor logic stages I, II and III by the coded pulses $\phi_1$, $\phi_2$ and $\phi_3$ which are characterized by the particular pulse pattern shown in FIG. 4A. The transient output from the first stage I occurs when this ferrite core is RESET from channel A input on phase $\phi_1$, changing the magnetic flux condition from $\phi_2$ on a previous set signal from channel B input. The output of stage I can therefore be written $AB\phi_1$, i.e. an output pulse occurs in phase with the $\phi_2$ pulses provided that inputs from channels A and B are both present.

The outputs of the other two stages II and III may be likewise described by the terms $BC\phi_2$ and $CA\phi_3$. The combined output of the three stages I, II and III can be written as $AB\phi_1 + BC\phi_2 + CA\phi_3$, that is, if signals from all channels are present output pulses will occur at all three phases $\phi_1$, $\phi_2$ and $\phi_3$. If the signal from any one channel fails, two terms of the above expression will be off and only one phase of the three phases will remain. The pulse repetition frequency is thus divided by three. If any pair or all of the input channels are off, all terms in the combined output will disappear. The output of the majority logic configuration has therefore three states. These are:

(1) A pulse repetition frequency corresponding to the three pulse trains $\phi_1$, $\phi_2$, $\phi_3$ interleaved with one another.

(2) A pulse repetition frequency corresponding to only one phase of $\phi_1$, $\phi_2$, or $\phi_3$, i.e. one third of the p.r.f. in (1) when the signal from one channel is removed.

(3) Complete absence of pulses if a majority of the three inputs disappear or are removed.

The part of the system so far described may be adequate to provide 2 out of 3 majority logic for three channels for relaying the resultant majority signal to connection W to a transducer. In larger control circuits, however, such as those for nuclear reactors presently being considered, the resultant signal must be combined with others emanating from similar groups of channels in a common trip line T which feeds the transducer.

In FIG. 4 the outputs from other groups similar to that described are fed to the trip line via connections $U+V$.

In each case the combined outputs from the three connections, W, U, V, are used to set a ferrite core-transistor logic element a number of which are employed in cascade as an "AND" gate in a circuit which introduces the trip line T. The first logical element of the cascade is reset by a pulse $\phi_{INT}$ which, as shown in FIG. 4A, is a series of pulses interleaved between those of $\phi_1$, $\phi_2$ and $\phi_3$. The output of each element after the first is applied to reset the following element of the cascade. The RESET condition can only pass to the final output of the chain (leading to the transducer) if all elements had previously received the SET signal from their appropriate majority logic decision. Absence of any one of the set pulses from any of the majority logic configurations is therefore indicated at the output of the cascaded chain of logic elements by the absence of the following reset pulse. Quite obviously the output may be sensed by a suitable meter to detect this condition by inspection.

Owing to the bistable nature of the logic elements used, any given magnetic flux setting of the ferrite core is preserved or stored until some later time when it is reset. Thus the result of a single channel being removed (or failing) in each of two different groups will be as follows. The combining element nearest to the source $\phi_{INT}$ will receive a set pulse on only one of the three phases $\phi_1$, $\phi_2$, $\phi_3$ and consequently only that pulse of the $\phi_{INT}$ pulse train immediately following that one phase will be passed on along the trip line. A further single channel failure in a majority logic configuration introduced later along the trip line will cause no further change in pulse repetition frequency because the p.r.f. of the set pulses introduced by the second channel, having the signal in one of its channels absent, is the same as the p.r.f. of the reset pulses which have been allowed to pass by the first of the chain having one channel "off." A more complex situation arises when $n$ and $m$ have values larger than the 2 and 3 employed in FIGS. 3 and 4.

The pulse coding technique described above in relation to logic elements comprising single aperture ferrite cores is applicable also to multi-aperture cores such as those known as laddic. The use of laddics as majority logic elements is known and reference to such use may be found in the British Nuclear Energy Society Journal, January 1963, vol 2, No. 1, pp. 74, 85 and for the present purposes it is sufficient to state that the laddic acts as a gate in which an output is passed so long as the majority of inputs are preesnt at the same time. Thus, in a two out of three system, the inputs each are applied to hold windings on two different ones of three rungs of the laddic. This particular use of laddic provides a further example of a majority logic element which provides an output which appears only in response to the presence of a majority of inputs but gives no information of the state of the majority of inputs.

Consider for example FIG. 5 which shows a diagram of a multi-aperture ferrite core having six rungs $r1-r6$, and side rails 7, 8. Three selected rungs, $r1$, $r3$ and $r5$, each carry two windings pertaining to two different ones of the channels A, B, and C, and these "hold" windings are designated $a$, $b$ and $c$ accordingly. The rail 7 carries a set of windings between alternate rungs, and rail 8 a drive winding. The laddic has an output winding which is wound on a part of the laddic in which the flux reverses as a result of a pulse being applied to the reset winding after the application of a drive pulse, provided that at least one of the hold windings on each of the selected rungs $r_1$, $r_3$ and $r_5$ are energised.

FIG. 5A shows the pulse phasing. The pulse patterns $\phi_R$ and $\phi_D$ are the reset and drive patterns respectively, whilst the hold windings are given pulse patterns indicated $\phi_{HA}$, $\phi_{HB}$, $\phi_{HC}$ characteristic of channels A, B and C respectively. Thus when all channels are present the output pulse pattern will be as shown at $\phi_{OUT}$ with a pulse for each flux reversal brought about by a drive pulse.

FIG. 5B shows the effect of a failure of channel A. As can be seen it is not until the arrival of the third drive pulse and every successive third pulse that flux reversal under the output winding occurs.

In majority logic circuits having a large number of inputs, it is necessary to combine laddic devices in cascade, the output of one laddic being used to energise the reset winding of the next. The effect of pulse coding on such an arrangement in which the output of laddic L1 is used to reset ladddic L2 is illustrated in FIG. 5C, from which it will be seen that the final output is no different from the reset pulse pattern. Hence the output gives information about the minority signals, but does not indicate in which laddic the minority failure has occurred.

If a number of laddic elements are combined by cascading in this way, then can be made to form an integral part of the trip line feeding the transducer. However this arrangement has two disadvantages. Firstly it is necessary to provide 2 interleaved sets of coding pulses to maintain the correct phase relationships between SET and DRIVE on adjacent laddics. Secondly it is not possible to detect the states of the individual groups of laddic (hold) inputs by monitoring each laddic output because the output pattern of a particular stage is determined by the pulse pattern received from proceeding stages as well as the states of its own group of hold inputs.

A preferred method of combining the outputs of a number of laddic majority logic gates into a trip line is shown in FIG. 6. In this arrangement all the laddic elements are autonomous and all use the same arrangement of coding pulses. Monitors connected to the individual laddic outputs would therefore respond to the states of the respective group of inputs only. To combine the logic elements into the trip line arrangement shown in FIG. 6 uses a core/transistor logic element such as is described in FIG. 3. The reason for this is, as will be seen from the above, that the laddic depends upon the time coincidence of pulses, and it may be that reset pulse for the second laddic element will not be in proper phase with $\phi_{INT}$ pulse and so that the next laddic may never be reset.

FIG. 6 shows the logic diagram for a two of three majority logic applied to three laddics L1, L2 and L3 which receive signals indicative of parameters $N-1$; N and $N+1$ through their respective inputs P, R, S; A, B, C and X, Y, Z. The inputs are coded in the manner of FIG. 1A. The laddic in each case acts as an AND gate in which the output majority signal is fed into the transducer via a trip line, the three laddic outputs being each joined into the trip line by way of core/transistor logic elements similar to those in FIGS. 3 and 4. The core/transistor logic element CT1 is switched by a pulse pattern $\phi_{INT}$ which is in phase with the laddic reset pulse pattern. Thus the laddic output sets the core of the CT1 and this is phased with the pulse pattern $\phi_{INT}$ so that the core CT1 is switched. The resultant outgoing pulse train is used to reset the next core/transistor logic element CT2.

The application of pulse coding to majority logic systems means that because information which is available about the majority signal also gives information about the minority of inputs continuity testing may be carried out whilst the system is maintained safely in operation. For example, if the output pulse pattern indicates all three channels present any one of the three channels in a two out of three logic system may be intentionally interrupted temporarily while the output pulse pattern from that group is examined to detect if the characteristic pulse patterns of "one channel missing" condition is produced. If the pulse pattern (frequency) monitors are permanently connected to the outputs of the majority logic circuits, continuous vigilance is exercised over all the inputs.

In FIG. 7 a number of trip lines T1, T2 and T3 each serve to convey signals indicative of a number of parameters supplied to the trip lines through majority logic gates as described above, to a transducer Z.

The coded pulse pattern which is the final coded output of any trip line is observable by frequency meters FM1–FM3. The pulsed output is converted to a D.C. signal in converter C1–C3 and before being passed to a final AND gate 40 it must be recoded to provided minority information regarding minority failure of the three trip line T1–T3. To this end, three gates 29–31 are provided each with a pair of two different phase of phases $\phi_1$, $\phi_2$ and $\phi_3$ such that the output of each trip line is recognisable as a characteristic pulse pattern. These are applied to an AND gate 40 from which the loss of one input is recognisable by a 3:1 frequency change by frequency meter FM4.

The coding pulse patterns $\phi_1$, $\phi_2$, $\phi_3$ are derived from pulse generators 41 which supply channel coding pulses to the trip parameters but each phase is taken from a different generator because otherwise the failure of one generator would cause the network output to disappear and so operate the transducer. Because the pulse phases are taken from separate pulse generators these must be run in synchronism to avoid possible phase difference between generators affecting the coincidence of pulses.

Thus any failure of a minority of inputs on any line is detectable by pulse pattern appearing at meters FM1–FM3 whilst any minority of trip line failures (i.e. 1 out of 3) is detectable by monitor FM4 by which means also proof testing of any line can be carried out by intentionally interrupting any trip line at X, or any other point, without fear of operating the transducer.

I claim:

1. A supervisory circuit for supervising the presence of input signals on a group of $n$ input conductors comprising a pulse source for providing $n$ pulse trains each having a characteristic unique to a corresponding input, and a serially connected majority logic system for receiving said $n$ input pulse trains and for providing an output in response to the presence of a majority $m$ of said $n$ inputs, said system comprising a network of $n$ gates connnected in parallel and means for applying a different combination of $m$ pulse trains to each gate, said system being responsive to the unique characteristics of the pulse train such that the output provided thereby is indicative of the particular inputs present.

2. A supervisory circuit as claimed in claim 1 wherein the pulse repetition frequency is different for each input pulse train.

3. A supervisory circuit as claimed in claim 1 wherein said input gates comprise bistable AND logic elements each receiving a different pair of input pulse trains so that each gate yields an output in response to a single pulse from each of said input pulse trains.

4. A supervisory circuit as claimed in claim 8 further comprising a second set of gates for receiving, as inputs, the outputs of the input gates.

References Cited
UNITED STATES PATENTS

| | | | |
|---|---|---|---|
| 2,950,461 | 8/1960 | Tryon | 340—147T |
| 3,312,941 | 4/1967 | Booth et al. | 340—166 |
| 3,371,320 | 2/1968 | Lachenmayer | 340—166X |
| 3,402,392 | 9/1968 | Schroeder | 340—166 |

HAROLD I. PITTS, Primary Examiner

U.S. Cl. X.R.

340—147, 167, 170, 171